United States Patent

[11] 3,622,033

[72] Inventors: William W. Butler, Hull, England; Harvey Holtby, Hull, England; Graham J. T. Pinder, North Ferriby, England; Sidney J. Moore, Willerby, England; Bernard Faulkner, deceased, late of Willerby, England by Violet E. Faulkner, legal representative
[21] Appl. No.: 853,390
[22] Filed: Aug. 27, 1969
[45] Patented: Nov. 23, 1971
[73] Assignee: J. H. Fenner & Company Limited, Hull, England
[32] Priority: Aug. 31, 1968
[33] Great Britain
[31] 41708/68

[54] OIL FILLER PLUG WITH VENT PASSAGE
6 Claims, 1 Drawing Fig.

[52] U.S. Cl. ................................................ 220/44, 55/510
[51] Int. Cl. ........................................................ B65d 51/16
[50] Field of Search ............................................. 220/44; 55/507, 505, 510

[56] References Cited
UNITED STATES PATENTS
2,650,673  9/1953  Bering et al. ............... 220/44
3,266,229  8/1966  Witkowski .................. 55/510
FOREIGN PATENTS
793,847  4/1958  Great Britain ............... 220/44

Primary Examiner—George T. Hall
Attorney—Beveridge & De Grandi

ABSTRACT: A combined oil filler and breather plug comprising a body adapted for removable attachment to an oil exit port on a machine casing, and ventilating passage means within the body which, when the body is attached to said oil input port, connect the inside of said machine casing to an exit port or ports at the exterior of said body a filter element formed from an interstitial plastics material being located externally of the plug body so as to completely enclose said exit port or ports of the ventilating passage means whereby air passing through the plug to the machine casing must pass through the filter.

PATENTED NOV 23 1971 3,622,033
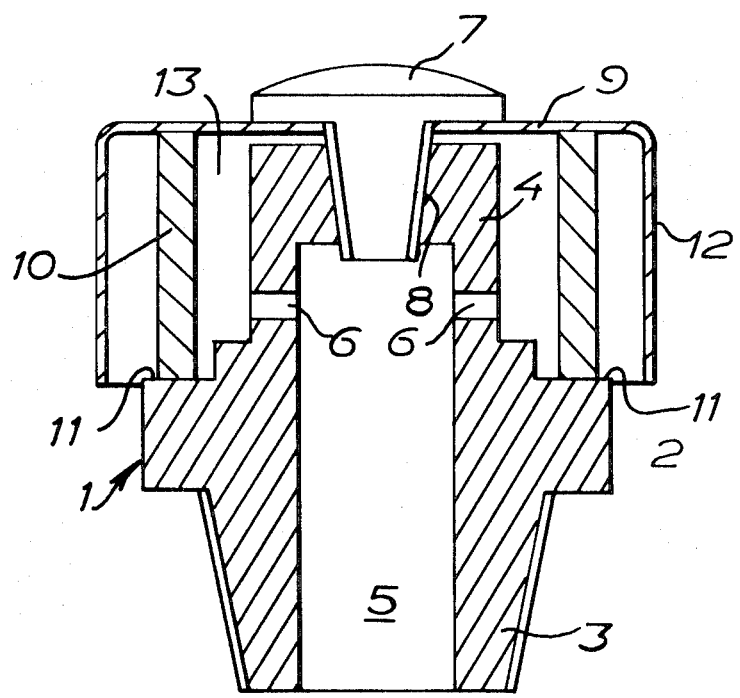
INVENTORS:
WILLIAM WELLS BUTLER,
HARVEY HOLTBY,
GRAHAM JEREMY THOMPSON PINDER,
SIDNEY JACK MOORE,
and
BERNARD FAULKNER
BY
Beveridge + De Grandi,
Attorneys.

OIL FILLER PLUG WITH VENT PASSAGE

The present invention relates to oil filler plugs for machine casings and particularly to oil filler plugs which are additionally adapted to function as breather elements.

Combined filler and breather plugs are known which incorporate filter elements made of compressed paper or sintered bronze. However such known plugs tend to be expensive to produce.

According to the present invention a combined oil filler and breather plug comprises a body adapted for removable attachment to an oil input port on a machine casing, and ventilating passage means within the body which, when the body is attached to said oil input port, connect the inside of said machine casing to an exit port or ports at the exterior of said body, a filter element formed from an interstitial plastics material being located externally of the plug body so as to completely enclose said exit port or ports of the ventilating passage means whereby air passing through the plug to the machine casing must pass through the filter element.

Preferably the plug body includes an externally screw-threaded portion adapted to engage a mating screw-threaded portion on said machine casing.

Conveniently, the filter element is cylindrical and is rigidly held between a shoulder portion of the plug body and a cap screwed onto the plug body.

Preferably the plug is made from a rigid synthetic plastics material such as that sold under the registered trademark "-DELRIN," but may equally well be metallic.

Advantageously, the plug body is formed to display a hexagonal configuration over at least a part of its length in order to facilitate the tightening of the screw by means of a suitable hand tool.

The invention will be further described, by way of example, with reference to the accompanying drawing which is a sectional elevation of one embodiment of a combined oil filler and breather plug constructed in accordance with the present invention.

The combined plug shown in the drawing has a body 1 comprising a substantially cylindrical center portion 2, an externally screw-threaded tapered projection 3 and a generally cylindrical neck portion 4. The plug 1 has an axial bore 5 which is connected to one or more radially directed passages 6 in the walls of the neck portions 4, two such passages 6 being shown in the drawing.

A metal cap 9 is secured to the plug 1 by a screw 7 which is received in a screw-threaded bore 8 in the neck portion 4, the bore 8 extending axially of the plug 1 and communicating with the bore 5.

A cylindrical filter element 10 is rigidly held between the cap 9 and a shoulder 11 on the center portion 2, the filter element 10 being embraced and protected towards the outside by a cylindrical cover portion 12 of the cap 9, this cover portion 12 being coaxial with the plug body 1. The cylindrical filter 10 and the external surface of the neck portion 4 define an annular space 13 which communicates with the bore 5 via the passages 6.

In use, the tapered portion 3 of the plug 1 is screwed into the oil input port of the machine casing. The metal cap 9 may be released to allow the filter to be removed or changed by removing the screw 7.

When the cap is in place, as shown in the drawing, an airtight abutting relationship exists between the filter element 10 and both the shoulder 11 and the metal cap 9 so that air drawn into the machine must pass through the filter 10, the passages 6 and the bore 5. Any solid particles are thus trapped by the filter element 10 and prevented from entering the machine where they could possibly cause damage to bearings or other machine parts.

In a further embodiment the cylindrical body portion 2 described with reference to the drawing is formed to have a hexagonal configuration over at least a part of its length in order to facilitate the tightening of the screw by means of a suitable hand tool.

Conveniently the plug 1 is made from a rigid synthetic plastics material such as that sold under the registered trademark "Delrin," but it can equally well be made in any suitable metallic or nonmetallic material.

We claim:

1. A combined oil filler and breather plug comprising a plug body, screw thread means on the plug for attaching the plug body to an oil input port on a machine casing, ventilation passage means within the plug body, exit port means for the ventilating passage means which are located at the exterior of said plug body and which, when the plug body is attached to said oil input port, are connected to the inside of the machine casing by said ventilating passage means, a shoulder formed on the plug body, a cap releasably attached to the plug body, and a cylindrical filter element formed from an interstitial plastics material being rigidly located between said shoulder on the plug body and the cap so as to completely enclose exit port means.

2. A plug according to claim 1 in which at least one radially directed passage connects the exit port means to said ventilating passage means, and in which the ventilating passage means comprises an axial bore in said plug body.

3. A plug according to claim 2 in which said plug body comprises a generally cylindrical center portion, an externally screw-threaded projection on said center portion serving for connecting the plug body to said machine casing, and a generally cylindrical neck portion extending from said center portion in which said exit port means are located.

4. A plug according to claim 2 in which said plug body comprises a center portion of generally hexagonal configuration to facilitate tightening of the plug onto said machine casing by means of a suitable hand tool, an externally screw-threaded projection on said center portion serving for connecting the plug body to said machine casing, and a generally cylindrical neck portion extending from said center portion in which said exit port means are located.

5. A plug according to claim 3 wherein an annular space is formed between said filter and said neck portion of the plug body.

6. A plug according to claim 5 in which a cylindrical cover portion is provided on the cap which is coaxial with the plug body and which embraces the filter to provide protection therefor.

* * * * *